(12) United States Patent
Oke (10) Patent No.: US 10,837,291 B2
(45) Date of Patent: Nov. 17, 2020

(54) TURBINE ENGINE WITH COMPONENT HAVING A COOLED TIP

(71) Applicant: GENERAL ELECTRIC COMPANY, Schenectady, NY (US)

(72) Inventor: Rohit Anand Oke, Arlington, MA (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 15/816,347

(22) Filed: Nov. 17, 2017

(65) Prior Publication Data

US 2019/0153872 A1 May 23, 2019

(51) Int. Cl.
*F01D 5/18* (2006.01)

(52) U.S. Cl.
CPC .......... *F01D 5/187* (2013.01); *F05D 2220/32* (2013.01); *F05D 2240/10* (2013.01); *F05D 2240/307* (2013.01); *F05D 2240/35* (2013.01)

(58) Field of Classification Search
CPC ........................... F01D 5/187; F05D 2240/307
See application file for complete search history.

(56) References Cited

U.S. PATENT DOCUMENTS

| | | |
|---|---|---|
| 3,427,001 A | 2/1969 | Malley et al. |
| 4,073,599 A | 2/1978 | Allen et al. |
| 4,604,031 A * | 8/1986 | Moss ................. F01D 5/187 |
| | | 415/115 |
| 4,940,388 A | 7/1990 | Lilleker et al. |
| 5,488,825 A | 2/1996 | Davis et al. |
| 6,139,269 A * | 10/2000 | Liang ................. F01D 5/20 |
| | | 416/97 R |
| 6,609,884 B2 * | 8/2003 | Harvey ................. F01D 5/187 |
| | | 415/115 |
| 7,600,973 B2 | 10/2009 | Tibbott et al. |
| 7,654,795 B2 | 2/2010 | Tibbott |
| 7,713,026 B1 | 5/2010 | Liang |
| 8,157,505 B2 | 4/2012 | Liang |
| 8,172,507 B2 | 5/2012 | Liang |
| 8,702,391 B2 | 4/2014 | Bregman et al. |
| 9,157,329 B2 | 10/2015 | Nadeau et al. |
| 9,376,919 B2 | 6/2016 | Fujimoto |
| 2002/0106275 A1 * | 8/2002 | Harvey ................. F01D 5/187 |
| | | 415/115 |
| 2007/0141385 A1 * | 6/2007 | Rucker ................. C23C 10/18 |
| | | 428/680 |
| 2017/0204730 A1 * | 7/2017 | Benson ................. F01D 5/187 |

* cited by examiner

*Primary Examiner* — Eldon T Brockman
(74) *Attorney, Agent, or Firm* — McGarry Bair PC (57) ABSTRACT

An apparatus and method an airfoil for a turbine engine, the airfoil comprising an outer wall defining an interior bound by a pressure side and a suction side extending axially between a leading edge and a trailing edge defining a chord-wise direction and extending radially between a root and a tip defining a span-wise direction. The airfoil further includes a first cooling circuit having a first portion and a first tip portion and a second cooling circuit having a second portion and a second tip portion.

31 Claims, 6 Drawing Sheets

TURBINE ENGINE WITH COMPONENT HAVING A COOLED TIP

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil or blade, a platform and a dovetail mounting portion. The turbine blade assembly includes cooling inlet passages as part of serpentine circuits in the platform and blade used to cool the platform and blade. The serpentine circuits can extend to cooling holes located along any of the multiple surfaces of the blade including at the tip.

When flowing through the serpentine circuits, pressure differential between an interior of the serpentine circuits and an exterior of the blade which varies along the surface of the blade, can influence the rate and effectiveness of cooling along these multiple surfaces.

BRIEF DESCRIPTION OF THE INVENTION

In one aspect, the present disclosure relates to an airfoil for a turbine engine, the airfoil comprising an outer wall defining an interior bound by a pressure side and a suction side extending axially between a leading edge and a trailing edge defining a chord-wise direction and extending radially between a root and a tip defining a span-wise direction, a first cooling circuit having a first portion extending along the leading edge and a first tip portion extending along the tip, a second cooling circuit having a second portion extending along the trailing edge and a second tip portion extending along the tip, and at least one cooling hole provided at the tip and in fluid communication with at least one of the first or second tip portions.

In another aspect, the present disclosure relates to an engine component for a turbine engine, the engine component comprising an outer wall defining an interior bound by a pressure side and a suction side extending axially between a leading edge and a trailing edge defining a chord-wise direction and extending radially between a root and a tip defining a span-wise direction, a first cooling circuit having a first portion extending along the leading edge and a first tip portion extending along the tip, a second cooling circuit having a second portion extending along the trailing edge and a second tip portion extending along the tip, and at least one cooling hole provided at the tip and in fluid communication with at least one of the first or second tip portions.

In yet another aspect, the present disclosure relates to a method of cooling an airfoil with an outer wall defining an interior bound by a pressure side and a suction side extending axially between a leading edge and a trailing edge defining a chord-wise direction and extending radially between a root and a tip defining a span-wise direction, the method comprising passing a first cooling fluid through a first cooling circuit within the airfoil and having a first tip portion extending along the tip, passing a second cooling fluid through a second cooling circuit within the airfoil and having a second tip portion extending along the tip, and expelling the first cooling fluid through a first set of cooling holes in fluid communication with the first tip portion and the second cooling fluid through a second set of cooling holes in fluid communication with the second tip portion.

DETAILED DESCRIPTION OF THE INVENTION

Aspects of the disclosure described herein are directed to the formation of a first and second tip portion in fluid communication with a first and second cooling circuit for cooling a tip of a blade assembly. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications as well as generation turbines where the first and second tip portions can be included in a power generation blade.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
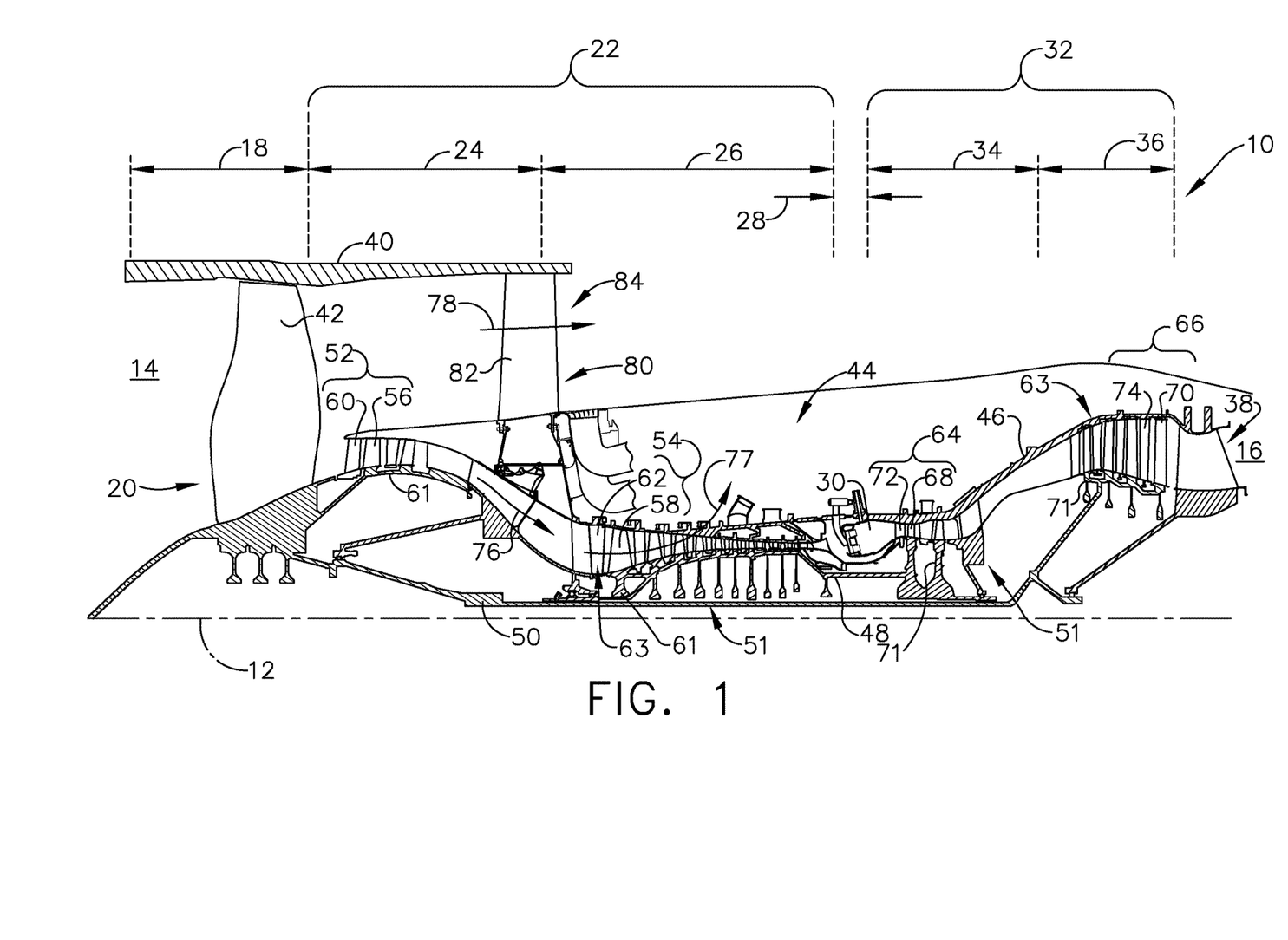
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
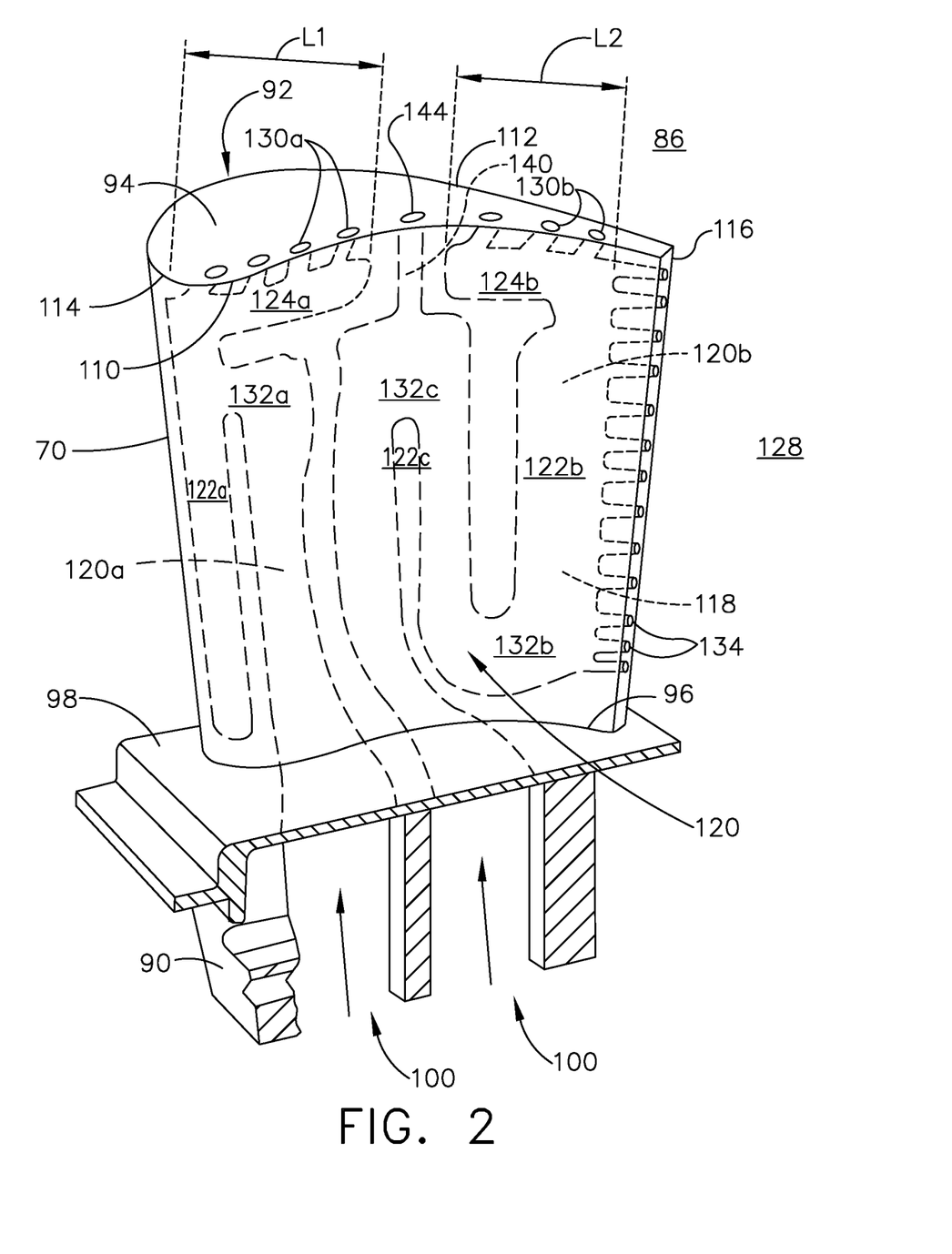
FIG. 2 is a perspective view of an airfoil for the gas turbine engine of FIG. 1 including internal passages illustrated in phantom.

FIG. 2 is a perspective view of a turbine blade assembly 86 with an engine component in particular a turbine blade 70 of the engine 10 from FIG. 1. Alternatively, the engine component can include a vane, a shroud, or a combustion liner in non-limiting examples, or any other engine component that can require or utilize cooling passages formed from an investment casting process and having a trailing edge or tip portion element.

The turbine blade assembly 86 includes a dovetail 90 and an airfoil 92. The airfoil 92 extends between a tip 94 and a root 96 to define a span-wise direction. The airfoil 92 mounts to the dovetail 90 on a platform 98 at the root 96. The platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil shape extending between a leading edge 114 and a trailing edge 116 to define a chord-wise direction. The airfoil 92 has an interior 118 defined by outer wall 119 and bound by the sides 110, 112. Multiple cooling circuits 120, illustrated as a first cooling circuit 120a and a second cooling circuit 120b, can be fluidly coupled with at least one of inlet passages 100. In one non-limiting aspect of the disclosure discussed herein, investment casting can be utilized to manufacture the serpentine circuits 120 by developing an investment casting core.

The first cooling circuit 120a can include a first portion, or leading edge portion 122a, extending radially along the leading edge 114. A first tip portion 124a is fluidly coupled with the leading edge portion 122a of the first cooling circuit 120a proximate the leading edge 114 and the tip 94. The first tip portion 124a extends axially along the tip 94 a length (L1) and is fluidly coupled to an exterior 128 of the blade 70 via a first set of cooling holes 130a. Although the first set of first set of cooling holes 130a is illustrated as four cooling holes 130a, the set can include any number of cooling holes including only one. The first cooling circuit 120a can include at least one turn 132a. It is further contemplated that instead of a turn, the coolant can be transferred to 122a by cross over holes along the span-wise direction between the first cooling circuit 120a and the leading edge portion 122a. It should be understood that the first cooling circuit 120a can include multiple turns 132a and the at least one turn 132a is for illustrative purposes only and not meant to be limiting.

The second cooling circuit 120b can include a second portion, or trailing edge portion 122b extending radially along the trailing edge 116. The trailing edge portion 122b of the second cooling circuit 120b can be fluidly coupled to the exterior 128 of the blade 70 with at least one trailing edge hole 134. The trailing edge holes 134 can be cooling or film holes. A second tip portion 124b is fluidly coupled with the trailing edge portion 122b. The second tip portion 124b extends axially along the tip 94 a length (L2) and can be fluidly coupled to the exterior 128 of the blade 70 via a second set of cooling holes 130b. By way of non-limiting example the second set of cooling holes 130b is three cooling holes 130b, however it should be understood that the second set of cooling holes 130b can be any number of cooling holes including one. The second cooling circuit 120b can include at least one turn 132b. It should be understood that the second cooling circuit 120b can include a single turn 132b or multiple turns 132b as illustrated.

The second cooling circuit 120b can further include a central portion 122c. The central portion 122c is located between the leading edge portion 122a and the trailing edge portion 122b and can include a turn 132c. A tip channel 140 can be in fluid communication with the central portion 122c, by way of non-limiting example, at the turn 132c. The tip channel 140 can extend from an inlet 142 at the second cooling circuit 120b to an outlet 144 along the tip 94. The tip channel 140 can be located between the first and second tip portions 124a, 124b.

FIGS. 1 and 2 illustrate an environment in which the disclosure described herein is applicable. It should be understood that while illustrated as having a leading edge portion, trailing edge portion and central portion, there can be multiple of each of the portions in both the first and second cooling circuit. The first and second cooling circuits as described herein are for illustrative purposes only and not meant to be limiting. The airfoil 92 of FIG. 2 as an exemplary airfoil that can be made with, by way of non-limiting example, an investment casting process.

Figure 3:
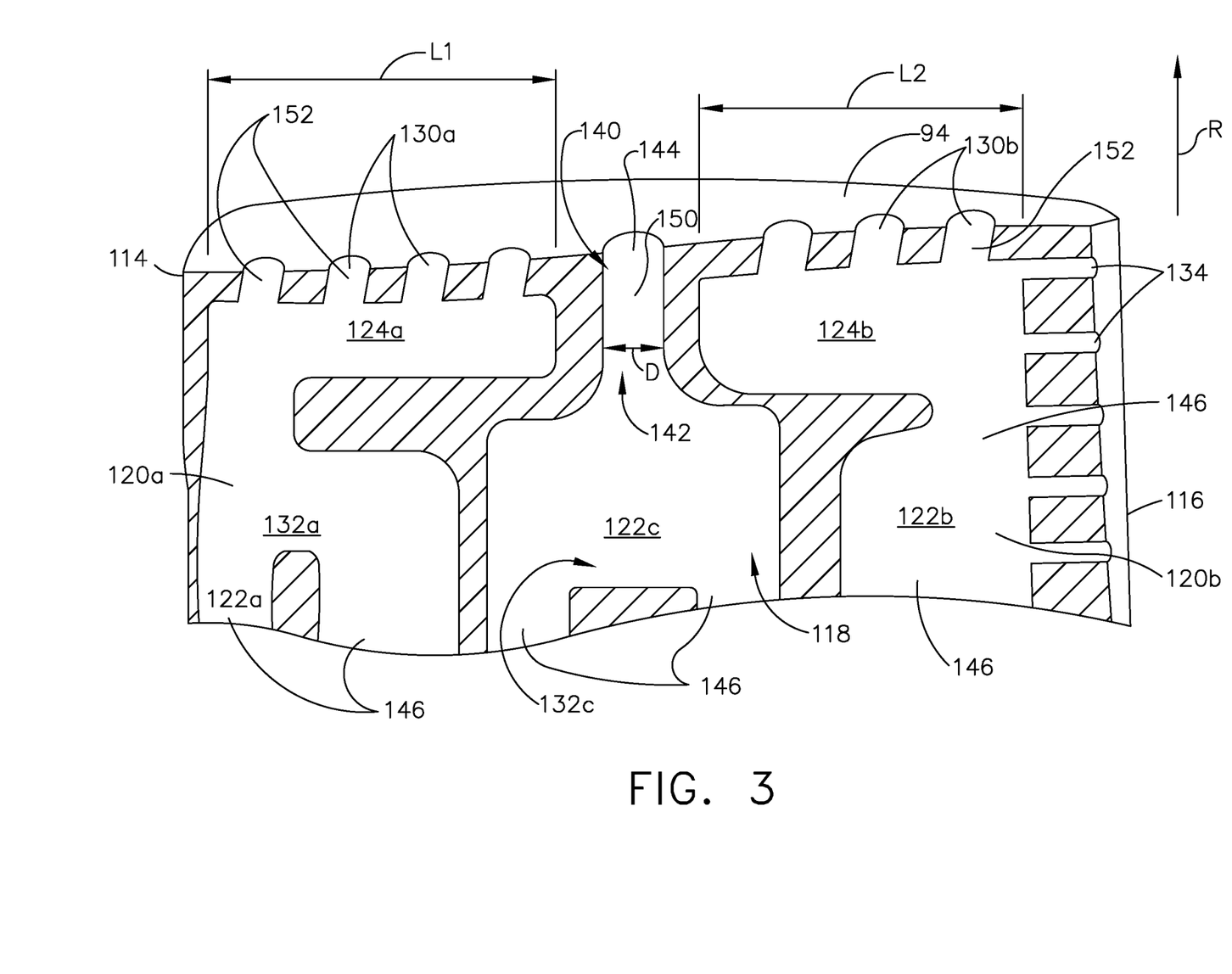
FIG. 3 is a perspective sectional view of a top portion of the airfoil of FIG. 2 illustrating a first and second tip portion of the internal passages in one aspect of the disclosure discussed herein.

FIG. 3 is an enlarged view of the tip 94 of the airfoil 92. The cooling circuits 120 are defined by multiple serpentine passages 146 separated by interior walls 148. The interior walls 148 further separate the first tip portion 124a from the second tip portion 124b. It is contemplated that the first and second tip portions 124a, 124b extend axially the same length such that (L1=L2). However, the axially lengths (L1) and (L2) can be different depending on the geometry of the tip 94 of the airfoil 92 in which they are formed. The tip channel 140 can extend through the interior wall 148 in a substantially radially direction between the first tip portion 124a and the second tip portion 124b to separate the first and second tip portions 124a, 124b. By way of comparison, the tip channel 140 can define a larger diameter (D) than the first and second set of cooling holes 130a, 130b. Additionally the tip channel 140 can have a larger outlet 144 than the first and second set of cooling holes 130a, 130b and define a cylindrical channel 150 oriented in the radial direction and larger than cylindrical channels 152 defined by first and second set of cooling holes 130a, 130b.

It is further contemplated that the first and second set of cooling holes 130a, 130b can be angled with respect to a radial direction (R). By "angled", it is meant that the centerline of the holes 130a, 130b can form an angle to a reference direction, which in this is a radial line emanating from the engine centerline or span-wise line passing through the airfoil. In most airfoil configurations the radial line and the span-wise line will be one and the same. While schematically illustrated as cylindrical channels 152, the first and second set of cooling holes 130a, 130b can be of differing geometries and include metering sections, diffusing sections, or other conventional cooling hole geometries. By way of non-limiting example, the cooling holes can have a cylindrical, laidback, fan-shaped, laidback fan-shaped, conical, or console shape. The first and second set of cooling holes 130a, 130b can be of similar or different geometries depending on location and function.

Figure 4:
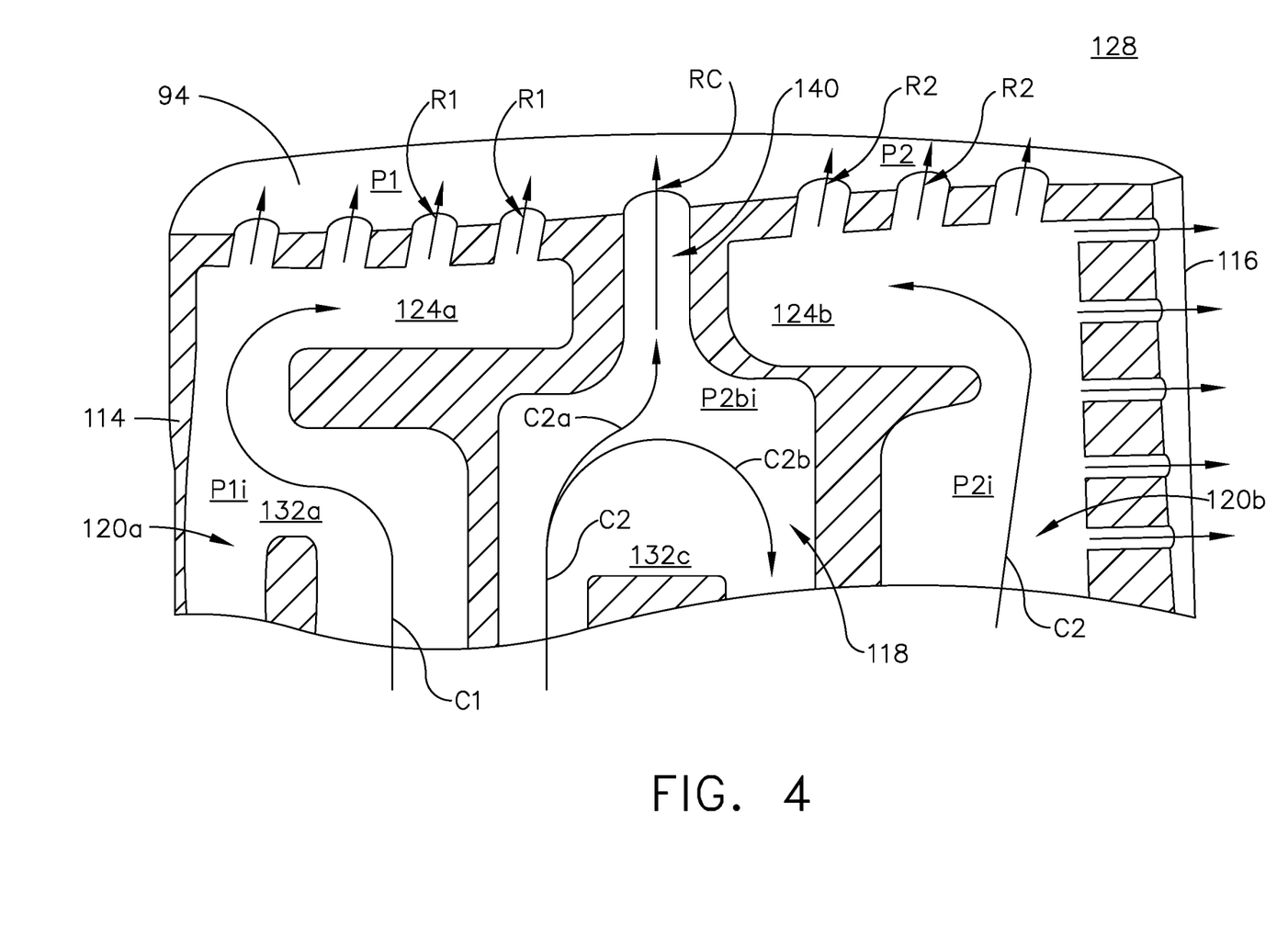
FIG. 4 is the same as FIG. 3 only illustrating a method of cooling the airfoil of FIG. 2 according to an aspect of the disclosure discussed herein.

A method of cooling the airfoil 92 is illustrated in FIG. 4. The method includes passing a first cooling fluid (C1) through the first cooling circuit 120a within the airfoil 92. The first cooling fluid (C1) can flow through the first cooling circuit 120a around turn 132a, into the first tip portion 124a and be expelled through the first set of cooling holes 130a at a first rate (R1) to cool the tip 94.

The method further includes passing a second cooling fluid (C2) through the second cooling circuit 120b which can include flowing the second cooling fluid (C2) around turns 132c, 132b (FIG. 2) and into the second tip portion 124a after which the second cooling fluid is expelled through the second set of cooling holes 130b at a second rate (R2) to cool the tip 94. It is further contemplated that the second cooling fluid (C2) is also expelled through the trailing edge holes 134, or by way of non-limiting example trailing edge bleed slots breaking out of the pressure side 110, along the trailing edge 116 to cool the trailing edge 116.

Both the first cooling fluid (C1) and the second cooling fluid (C2) can have a common origination source. By way of non-limiting example both the first cooling fluid (C1) and the second cooling fluid (C2) are bleed air 77.

The method can further include passing the second cooling fluid (C2) through the tip channel 140 between the first tip portion 124a and the second tip portion 124b. A first portion (C2a) of the second cooling fluid (C2) can flow through the second cooling circuit 120b and into inlet 142 of tip channel 140 while a second portion (C2b) of the second cooling fluid (C2) can continue around turn 132c and through the second cooling circuit 120b. The second cooling fluid (C2) expels at a channel rate (RC) from the tip channel 140 to further cool the tip 94. The method as described herein can further include cooling the airfoil 92 by convection by passing the first cooling fluid (C1) and second cooling fluid (C2) through the first and second cooling circuits 120a, 120b.

A first pressure (P1) exterior of the airfoil 92 and proximate the first tip portion 124a can differ with respect to a second pressure (P2) exterior of the airfoil 92 and proximate the second tip portion 124b. More specifically the first pressure (P1) proximate the leading edge 114 at the tip 94 is greater than the second pressure (P2) proximate the trailing edge 116 of the tip 94.

Pressure ratios between the exterior 128 of the airfoil 92 and the interior 118 facilitate the flow of the first and second cooling fluids (C1), (C2). A first interior pressure (P1$i$) within the first cooling circuit 120a and a second interior pressure (P2$i$) within the second cooling circuit 120b are maintained such that the pressure ratio (P1$i$:P1) is nearly equal to that of the pressure ratio (P2$i$:P2). The pressures can be regulated such that a difference between the individual pressures can be as large as 10-20 psia on an absolute level of 250 psia. Furthermore, an interior pressure (P2$bi$) of the second cooling circuit 120b proximate the tip channel 140 has a value between (P1$i$) and (P2$i$) such that the channel rate (RC) at which the second cooling fluid (C2) is expelled from the tip channel 140 occurs at approximately the same rate as the first rate (R1) at which the first cooling fluid (C1) is expelled from the first tip portion 124a. Furthermore, the first rate (R1) is approximately the same as the second rate (R2) at which the second cooling fluid (C2) is expelled from the second tip portion 124b. It should be understood that in any variation of the method as discussed herein rates (R1) ≈(R2)≈(RC).

Figure 5:
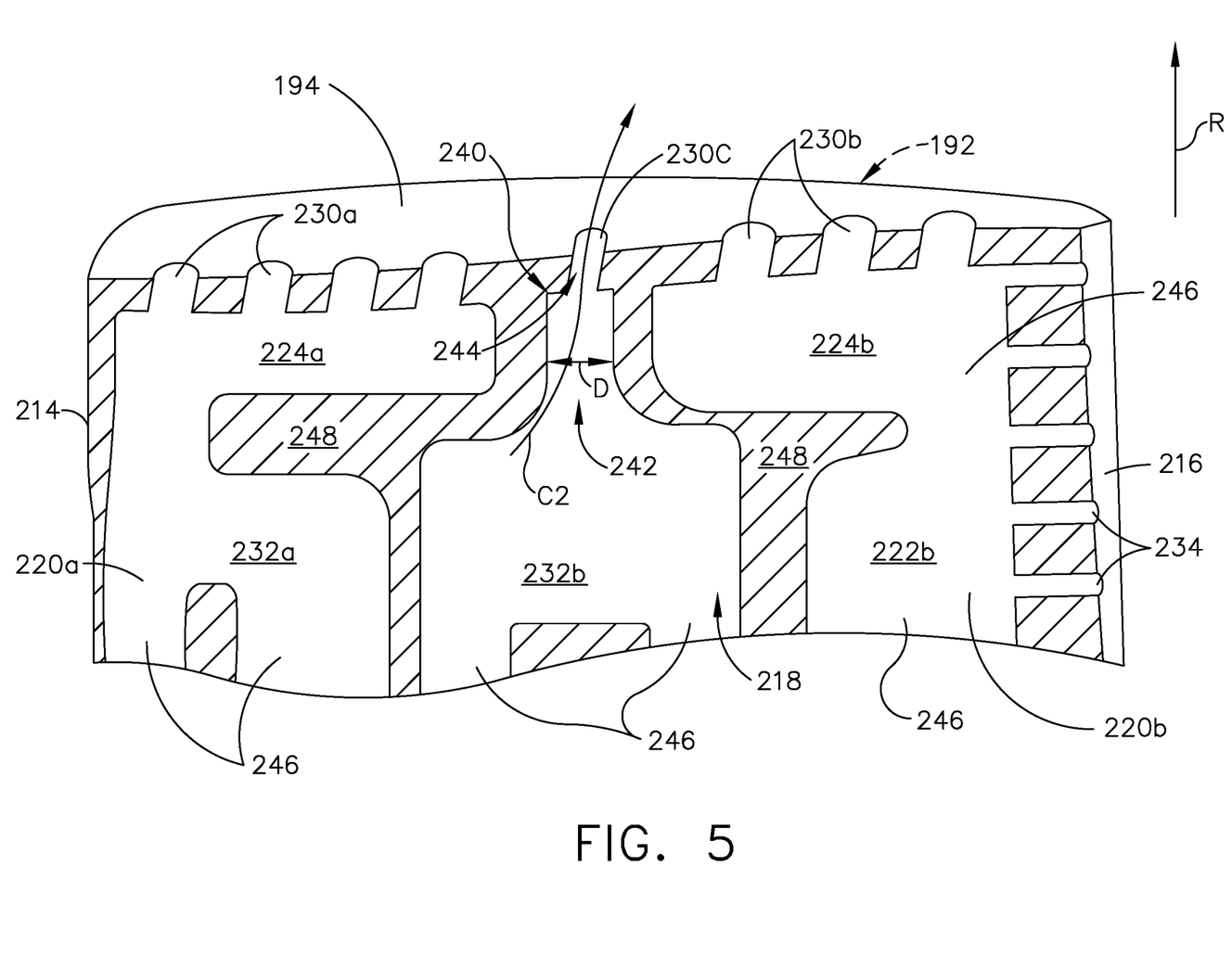
FIG. 5 is perspective sectional view of an alternative top portion of the airfoil of FIG. 3.

FIG. 5 illustrates a first and second cooling circuit 220a, 220b in another aspect of the disclosure discussed herein. The first and second cooling circuits 220a, 220b are substantially similar to the cooling circuits 120a, 120b. Therefore, like parts will be identified with like numerals increased by 100, with it being understood that the description of the like parts of the first and second cooling circuits 120a, 120b apply to the first and second cooling circuits 220a, 220b unless otherwise noted.

Cooling circuits 220 are separated by interior walls 248, specifically interior walls 248 can separate a first tip portion 224a from a second tip portion 224b at a tip 194 of airfoil 192. The first tip portion 224a and the second tip portion 224b can each respectively include at least one set of cooling holes 230a, 230b. A tip channel 240 can extend through the interior wall 248 in a substantially radially direction between the first tip portion 224a and the second tip portion 224b. The tip channel 240 can define a cylindrical channel 250 terminating in an outlet 244 fluidly coupled to a third set of cooling holes 230c extending to the tip 194. While illustrated as one cooling hole, the third set of cooling holes 230c can be multiple cooling holes. The cylindrical channel 250 can have a diameter (D) larger than the third set of cooling holes 230c.

The sets of cooling holes 230a, 230b, 230c can be of similar or different geometries depending on location and function. The sets of cooling holes 230a, 230b, 230c along with can be angled with respect to the radial direction (R). While schematically illustrated as straight channels, the sets of cooling holes 230a, 230b, 230c can be of differing geometries and include metering sections, diffusing sections, or other conventional cooling hole geometries. By way of non-limiting example, the sets of cooling holes can have a cylindrical, laidback, fan-shaped, laidback fan-shaped, conical, break out or console shape. It should be further understood that the cooling holes as described herein can be anywhere either along the pressure side, suction side or the tip plenum.

The method as described herein can further include expelling the second cooling fluid through the third set of cooling holes 230c and onto the tip 194. The rate (RC) at which the cooling fluid (C2) exits the third set of cooling holes 230c can still be approximately the same as the first rate (R1) and the second rate (R2) as described herein.

Figure 6:
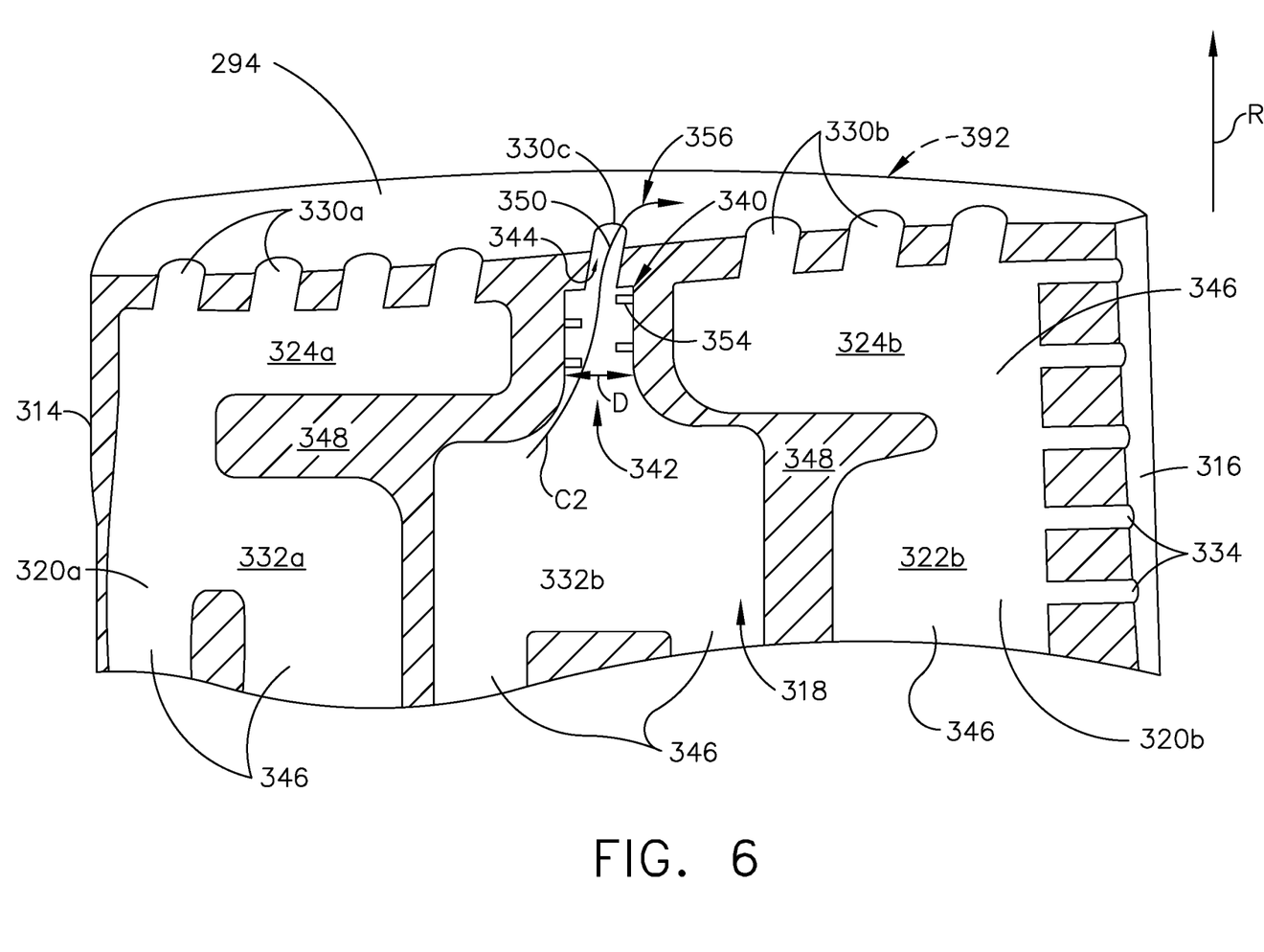
FIG. 6 is perspective sectional view of an alternative top portion of the airfoil of FIG. 3.

FIG. 6 illustrates a first and second cooling circuit 320a, 320b in another aspect of the disclosure discussed herein. The first and second cooling circuits 320a, 320b are substantially similar to the cooling circuits 220a, 220b. Therefore, like parts will be identified with like numerals increased by 100, with it being understood that the description of the like parts of the first and second cooling circuits 220a, 220b apply to the first and second cooling circuits 320a, 320b unless otherwise noted.

In yet another aspect of the disclosure discussed herein a tip channel 340 can extend through an interior wall 348 with an angled orientation with respect to the radial direction (R). The tip channel 340 can extend between first and second tip portions 324a, 324b of the first and second cooling circuits 320a, 320b. The tip channel 340 can define a cylindrical channel 350 terminating in an outlet 344 fluidly coupled to a third set of cooling holes 330c extending to a tip 294 of airfoil 292. The cylindrical channel 350 can have a diameter (D) larger than the third set of cooling holes 330c. It is further contemplated that the cylindrical channel 350 can include at least one flow enhancer 354. The flow enhancer 354 can be, by way of non-limiting example a turbulator, pin fin, pimple, or dimple.

The sets of cooling holes 330a, 330b, 330c can be of similar or different geometries depending on location and function. The sets of cooling holes 330a, 330b, 330c can be angled with respect to the radial direction (R). While schematically illustrated as straight channels, the sets of cooling holes 330a, 330b, 330c can be of differing geometries and include metering sections, diffusing sections, or other conventional cooling hole geometries. By way of non-limiting example, the sets of cooling holes can have a cylindrical, laidback, fan-shaped, laidback fan-shaped, conical, or console shape.

The method as described herein can further include flowing the second cooling fluid (C2) around flow enhancers 354 within the tip channel 340. The addition of flow enhancers 354 can produce a turbulated portion 356 at the tip 292.

It should be understood that the tip channels as described herein can also include flow enhancers, by way of non-limiting example turbulators, pin fins, pimples, or dimples and that illustrations described herein are not meant to be limiting.

Benefits associated with the disclosure discussed herein include optimizing a back flow margin, a flow channel to external pressure ratio, of the sets of cooling holes located at the tip of the airfoil. Additionally the tip channel provides additional cooling and/or dust mitigation, reducing the cooling flow required within the blade and to cool the place directly impacting the performance of the high pressure turbine. This reduction is possible by tailoring the pressure ratios along the tip by forming separate tip portions to optimize a pressure ratio in the proximity of the leading and trailing edges of the airfoil. A flow savings of 0.05-0.1% of total gas throughflow can be realized with the tip portions as described herein. There is also an additional temperature benefit at the trailing edge of between 15° F. and 25° F. which will result in better trailing edge durability. It is further contemplated that having a first and second tip portions maintains cooling of the tip of the airfoil in the event on of the tip portions becomes clogged.

Forming the tip channel, as described herein the spanwise tip channel exiting out of the interior, between the tip portions increases convection cooling at the tip and potentially eliminates some cooling holes from conventional airfoil tip design, resulting in the advertised flow savings. The spanwise tip channel also provides access to the interior at locations susceptible to dust accumulation. The dust can be ejected out of the interior to the gas path via the spanwise tip passage, resulting in durability to dust accumulation.

It should be understood that any combination of the geometry related to the orientation of the first and second tip portions with respect to each other and the tip channel is contemplated. The varying aspects of the disclosure discussed herein are for illustrative purposes and not meant to be limiting.

Drilling, investment casting, 3-D printing, or additive manufacturing are exemplary methods of forming the cooling circuits and cooling holes as described herein. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turbo engines as well. The application as disclosed herein can also have applicability in power generation stationary or land and marine engines.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    an outer wall defining an interior bound by a pressure side and a suction side extending axially between a leading edge and a trailing edge defining a chord-wise direction and extending radially between a root and a tip defining a span-wise direction;
    a first cooling circuit having a first portion extending along the leading edge and a first tip portion extending along the tip;
    a second cooling circuit having a second portion extending along the trailing edge and a second tip portion extending along the tip;
    a set of cooling holes provided at the tip and in fluid communication with at least one of the first or second tip portions; and
    a tip channel extending from an inlet in fluid communication with the second cooling circuit to an outlet along the tip and at a location between the first and second tip portions;
    wherein at least one of the tip channel or a cooling hole in the set of cooling holes is angled with respect to the radial direction towards the trailing edge.

2. The airfoil of claim 1 wherein the set of cooling holes is a separate set of cooling holes in fluid communication with each of the first tip portion, the second tip portion, and the tip channel.

3. The airfoil of claim 1 wherein the tip channel extends in a substantially radial direction.

4. The airfoil of claim 1 wherein the tip channel further comprises at least one flow enhancer.

5. The airfoil of claim 1 wherein the set of cooling holes is multiple cooling holes in fluid communication with each of the first tip portion and the second tip portion.

6. The airfoil of claim 1 wherein the first portion is a leading edge portion and the second portion is a trailing edge portion and the second cooling circuit further includes a central portion.

7. The airfoil of claim 6 wherein the second tip portion is in fluid communication with the trailing edge portion, and a tip channel extending from an inlet is in fluid communication with the second cooling circuit to an outlet along the tip is in fluid communication with the central portion.

8. The airfoil of claim 1 wherein the first tip portion is upstream from the second tip portion and both tip portions extend axially along the tip a same amount.

9. The airfoil of claim 1 wherein the first tip portion is upstream from the second tip portion and both tip portions extend axially along the tip a different amount.

10. The airfoil of claim 1 wherein the tip channel and at least one cooling hole in the set of cooling holes are angled with respect to the radial direction toward the trailing edge.

11. An engine component for a turbine engine, the engine component comprising:
    an outer wall defining an interior bound by a pressure side and a suction side extending axially between a leading edge and a trailing edge defining a chord-wise direction and extending radially between a root and a tip defining a span-wise direction;
    at least one interior wall separating the interior into multiple passages;
    a first cooling circuit having a first portion extending along the leading edge and a first tip portion extending along the tip;
    a second cooling circuit fluidly separated from the first cooling circuit by the interior walls and having a second portion extending along the trailing edge and a second tip portion extending along the tip;
    a set of cooling holes provided at the tip and in fluid communication with the first or second tip portions; and
    a tip channel extending from an inlet in fluid communication with the second cooling circuit to an outlet along the tip and at a location between the first and second tip portions;
    wherein the tip channel is angled with respect to the radial direction toward the trailing edge.

12. The engine component of claim 11 wherein the set of cooling holes is a set of cooling holes in fluid communication with each of the first tip portion, the second tip portion, and the tip channel.

13. The engine component of claim 11 wherein the tip channel extends in a substantially radial direction.

14. The engine component of claim 13 wherein at least one cooling hole in the set of cooling holes is angled with respect to the radial direction toward the trailing edge.

15. The engine component of claim 11 wherein the tip channel further comprises at least one flow enhancer.

16. The engine component of claim 11 wherein the set of cooling holes is a first set of cooling holes in fluid communication with the first tip portion and a second set of cooling holes in fluid communication with the second tip portion.

17. The engine component of claim 11 wherein the set of cooling holes is multiple cooling holes in fluid communication with each of the first tip portion and the second tip portion.

18. The engine component of claim 11 wherein the first portion is a leading edge portion and the second portion is a trailing edge portion and the second cooling circuit further includes a central portion.

19. The engine component of claim 18 wherein the second tip portion is in fluid communication with the trailing edge portion, and a tip channel extending from an inlet in fluid communication with the second cooling circuit to an outlet along the tip is in fluid communication with the central portion.

20. The engine component of claim 18 wherein trailing edge cooling holes are provided along the trailing edge of the engine component and are in fluid communication with the trailing edge portion.

21. The engine component of claim 11 wherein the first tip portion is upstream from the second tip portion and both tip portions extend axially along the tip a same amount.

22. The engine component of claim 11 wherein the first tip portion is upstream from the second tip portion and both tip portions extend axially along the tip a different amount.

23. A method of cooling an airfoil with an outer wall defining an interior separated by at least one interior wall into multiple passages and bound by a pressure side and a suction side extending axially between a leading edge and a trailing edge defining a chord-wise direction and extending radially between a root and a tip defining a span-wise direction; the method comprising:
passing a first cooling fluid through a first cooling circuit within the airfoil and having a first tip portion extending along the tip;
passing a second cooling fluid through a second cooling circuit fluidly separated from the first cooling circuit by the interior walls, located within the airfoil, and having a second tip portion extending along the tip; and
expelling the first cooling fluid through a first set of cooling holes at the tip in fluid communication with the first tip portion and expelling the second cooling fluid at an angle with respect to a radial direction toward the trailing edge through a second set of cooling holes at the tip in fluid communication with the second tip portion.

24. The method of claim 23 wherein the expelling the first cooling fluid occurs at approximately the same rate as expelling the second cooling fluid.

25. The method of claim 24 further comprising passing the second cooling fluid through a tip channel fluidly connected to the second cooling circuit and fluidly isolated from the first cooling circuit.

26. The method of claim 25 further comprising expelling the second cooling fluid from the tip channel at approximately the same rate as a rate at which the first and second cooling fluids are expelled from the first and second set of cooling holes.

27. The method of claim 26 further comprising expelling the second cooling fluid through a third set of cooling holes fluidly connected to the tip channel.

28. The method of claim 27 further comprising flowing the second cooling fluid around flow enhancers within the tip channel.

29. The method of claim 26 further comprising expelling the second cooling fluid from the tip channel at an angle with respect to a radial direction toward the trailing edge.

30. The method of claim 23 further comprising cooling the airfoil by convection.

31. The method of claim 23 further comprising expelling the first cooling fluid at an angle with respect to a radial direction toward the trailing edge.

* * * * *